United States Patent Office 3,349,018
Patented Oct. 24, 1967

3,349,018
CONTROLLABLE DEGRADATION OF α-OLEFIN POLYMERS USING IRRADIATION
James E. Potts, Millington, N.J., assignor to Union Carbide Corporation, a corporation of New York
No Drawing. Filed Oct. 28, 1963, Ser. No. 319,562
10 Claims. (Cl. 204—159.2)

This invention relates to α-olefin polymers and to a method for irradiating said polymers to control the molecular weight or molecular weight distribution thereof. More particularly, this invention relates to a method for controllably degrading α-olefin polymers such as polypropylene without the use of heat and/or mechanical shear and to the improved α-olefin polymers produced thereby.

Normally solid α-olefin polymers and especially propylene polymers are recognized in the plastics industry as possessing great commercial potential because of the many advantages provided by said polymers over other polyolefin polymers such as polyethylene. Propylene polymers, for example, can be produced in amorphous or crystalline form depending upon the catalysts and the reaction conditions employed. The high molecular weight, highly crystalline propylene polymers are characterized by their clarity, their high toughness and strength, their excellent mechanical resiliency and their stiffness moduli.

Many of the commerical processes presently employed in the preparation of α-olefin polymers result in po ymers which are of extremely high molecular weight and highly isotactic. Propylene polymers having intrinsic viscosities as high as 15 have been obtained; however, these polymers are so high in molecular weight that they are essentially intractable and cannot be molded or extruded. Heretofore, the molecular weight of α-olefin polymers was commonly controlled during polymerization by addition of various chain terminators such as hydrogen. The use of chain terminators is not completely satisfactory, however, because of productivity losses which result from chain termination as well as the d fficulties which arise in accurately feeding small amounts of terminators to the reaction medium. In addition, polymer formation and recovery techniques vary with the molecu'ar weight of the polymer thus, optimum performance of the production unit cannot be achieved with a wide product mix.

Other post polymerization processes such as pyrolysis and/or mechanical shear are also employed to control the molecular weight or degrade or reduce the molecular weight of the α-olefin polymers.

Pyrolysis of propylene polymers for example is not completely satisfactory because of the ease with which such polymers undergo oxidative degradation at elevated temperatures thereby requiring the presence of antioxidants. The high temperatures involved in thermal pyrolysis however, tend to decompose the antioxidants producing color, odor and chemical compounds of questionable merit from a toxicity viewpoint. Moreover, certain stabilizers are completely destroyed by pyrolysis temperatures and must be added in a subsequent step.

Many attempts to degrade high molecular weight α-olefin polymers by pyrolytic means have been unsuccessful due to the absence of melt flow properties above the crystalline melting point. Pyrolysis techniques are also subject to heat transfer problems with the mass of molten polymer resulting in varying degrees of degradation in different parts of the resin mass. Mechanical shear techniques are also subject to variable and localized degradation since it is extremely difficult to shear all portions of a resin mass between metal surfaces without producing extensive degradation of some parts of the resin.

Accordingly, it is an object of the present invention to provide a method for controllably reducing the molecular weight or degrading α-olefin polymers to any desired molecular weight level without the use of pyrolysis and/or mechanical shear.

It is another object of the present invention to impart unique melt rheological properties to α-olefin polymers thereby providing improved thermoforming properties than heretofore obtained with α-olefin polymers degraded to the same melt flow by pyrolysis or mechanical shear.

It is still another object of this invention to provide a method for substantially reducing the draw resonance phenomenon which occurs in the high speed extrusion of polymers.

These and other objects are accomplished in accordance with the present invention which provides a method for uniformly and controllably degrading α-olefin polymers which comprises subjecting the α-olefin polymer in air to ionizing radiation having an energy level in the range of from about 50 kev. (kilo electron volts) to about 20 mev. (million electron volts) to a total dose between about 0.01 to about 3 megareps but less than that which causes gelation.

The α-olefin polymers which can be suitably employed in the present invention are those which are normally solid at room temperature and are represented by the repeating unit

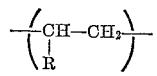

wherein R is an alkyl group containing from about 1 to 18 carbon atoms. Illustrative of such α-olefin polymers are polypropylene, poly(butene-1), poly(pentene-1), poly(4-methyl-pentene-1), poly(hexene-1), poly(octene-1), poly(octadecene-1), and the like. It is considered preferable in this invention that the repeating unit of the α-olefin polymers employed possess ratios of secondary (methylene) carbon atoms to tertiary (methylidyne) carbon atoms in the range of 1:1 to 16:1 and most preferably 1:1 to 6:1. It has been found that cross-linking becomes the predominant effect of irradiation above a methylene to methylidyne carbon atom ratio of about 16:1 which corresponds to a repeating unit containing 18 carbon atoms as in poly(octadecene-1). It is believed that the cessation of the predominance of degradation and the onset of cross-linking is due to the higher percentage by weight of methylene linkages present at the higher ratios which is more nearly characteristic of a polyethylene-type polymer rather than a polypropylene-type. As will be seen hereinafter, as the higher methylene/methylidyne carbon atom ratio is approached, degradation is still effected but the dosage requirements are more narrowly restricted to the lower dosage range in order to avoid a resulting irradiated polymer exhibiting a major cross-linked portion.

Several methods of preparing α-olefin polymers are known in the art, as for example, the processes relating to the preparation of polypropylene described in Australian patent application No. 6365/55 to Phillips Petroleum Company, United States Patent No. 2,692,259 to Edwin F. Peters and United States Patent No. 2,791,576 to Edmund Field. Interpolymers as well as block copolymers of α-olefins with other olefinic and vinyl monomers such as ethylene and styrene, particularly those copolymers containing a major proportion of an α-olefin polymerized therein, are also effectively employed. The α-olefins interpolymerized in said copolymers are preferably present in an amount of at least 50 percent by weight and most preferably at least 80 percent by weight.

The term "α-olefin polymer" as used herein is intended therefore, to include such interpolymers and block copolymers as well as α-olefin homopolymers as set forth hereinabove.

The α-olefin polymer or resin compositions can also include conventional additives such as colorants, stabilizers, lubricants, slip agents, plasticizers, fillers, and the like, and can be admixed with other polymeric materials either compatible or incompatible therewith.

The improved α-olefin polymers of this invention can be produced by subjecting them to ionizing radiation. As used herein, the term "ionizing radiation" includes that radiation which has sufficient energy to cause electronic excitation and/or ionization in the α-olefin polymer molecules but which does not have sufficient energy to affect the nuclei of the constituent atoms. Convenient sources of suitable ionizing radiation are high energy electrons produced by such means as Van de Graaff accelerators, linear electron accelerators, resonance transformers and the like, gamma ray producing radioactive isotopes such as $Co^{60}$ and $Cs^{137}$, spent nuclear fuel elements, X-rays such as those produced by conventional X-ray machines and the like.

Suitable ionizing radiation for use in the present invention generally has an energy level in the range of from about 50 kev. (kilo electron volts) to about 20 mev. (million electron volts).

The predominant effect of ionizing radiation on α-olefin polymers has heretofore been considered to be the formation of a cross-linked structure. Moreover, the resulting properties of the cross-linked polymer have been generally considered desirable whereas chain scission resulting from irradiation has been considered detrimental and any weakening or embrittlement of the polymer has been attributed thereto. Furthermore, a large degree of oxidation has also been associated with chain scission resulting in rancidity and concomitant unpleasant odor and color rendering the polymer unfit for such commercial purposes as food wrappings and the like.

Surprisingly, however, it has been found in this invention that subjecting α-olefin polymers in contact with air to ionizing radiation having an energy level in the range of about 50 kev. to about 20 mev. to a total dose of between about 0.01 to about 3 megareps but below that amount which causes gelation provides a method for controllably degrading α-olefin polymer to any desired molecular weight level. The incorporation of small amounts of antioxidant into the polymer prior to irradiation has been found, quite unexpectedly, to enable the degradation to proceed at controlled rates. For example, a virgin isotactic polypropylene, i.e., a freshly polymerized polypropylene having no antioxidant or other additive contained therein can be degraded to a hard wax with a mere 1 megarep exposure to ionizing radiation (see Table II presented hereinbelow); whereas, isotactic polypropylene containing a small amount of antioxidant, viz., less than about 0.5% of an antioxidant such as dibutyl para cresol or the like, when subjected to a similar 1 megarep dose is degraded to a melt flow of about 19 dgm./min. (see Table III presented hereinbelow).

It is believed that the effect of the small amount of antioxidant present in the polymer mass prior to irradiation has the effect of repressing oxidation while still enabling degradation to occur. Thus, in a preferred embodiment of the present invention, α-olefin polymers having the repeating unit

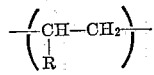

wherein R is an alkyl group containing from about 1 to 16 carbon atoms and which contains a stabilizing amount of antioxidant, preferably about 0.01 to about 0.1 percent by weight antioxidant, are uniformly and controllably degraded by subjecting said α-olefin polymer in air to ionizing radiation having an energy level in the range of from about 50 kev. to about 20 mev. to a total dose between about 0.01 to about 3 megareps and preferably to a total dose of 0.1 to 2 megareps. A megarep is equal to $1 \times 10^6$ reps; a rep being equivalent to the absorption of 83.8 ergs per gram in the material subjected to irradiation.

Antioxidants which are suitable for use in the present invention are those which can normally be employed in α-olefin resins such as propylene polymers to stabilize such resins against oxidation. Exemplary of such antioxidants are dibutyl para cresol, p-cresol-formaldehyde resins, para-tertiary-alkylphenol formaldehyde resins in admixture with amino dithioformates, aliphatic polyepoxides, organic phosphites, thiophosphates, or dithiophosphites, paratertiaryalkylphenol formaldehyde resins in admixture with mercapto compounds, 2-thiono-2-mercapto-dioxaphosphorinane compounds, tetraphenylsuccinodinitriles or triphenylmethane, or dithiophosphate metal salts and the like.

The radiation degraded α-olefin polymers of this invention are found to possess unique melt rheological properties compared to α-olefin polymers degraded by conventional pyrolytic and/or mechanical shear methods. Quite unexpectedly, it has been found that radiation degraded α-olefin polymers such as polypropylene can be extruded and drawn down at much higher linear speeds without the occurrence of draw resonance or surging, i.e., the phenomenon characteristic of thermoplastic extrusion processes which occurs at high linear speeds and causes uneven thicknesses or ripples in the film or coating being produced.

High linear processing speeds are economically attractive and permit thinner films and coatings to be attained provided the drawdown characteristics of the resin permit such speeds. The higher no-surge speeds, i.e., speeds attained without causing uneven thicknesses or ripples in the extrudate, attained with the radiation degraded α-olefin polymers of the present invention are believed due to a combination of processes which occur when the α-olefin polymer is subjected to the extremely low doses of high energy ionizing radiation as discussed above. It has been found that the major effect of such dosages of high energy radiation absorption by α-olefin polymers is, quite unexpectedly, chain scission although a definite but minor amount of cross-linking also takes place. The term "cross-linking" is employed herein to describe the formation of carbon-carbon bonds between adjacent polymer molecules which leads to chain branching.

When the concentration of crosslinks reaches a given level, said level being a function of the molecular weight of the resin, the resin foms a three-dimensional gel network. This point is called the incipient gel point. Within the scope of the method of the present invention the incipient gel point is not attained due to the predominating effect of chain scission. Accordingly, the irradiated α-olefin polymers of the present invention are essentially gel-free. The net result is a different and unusual molecular weight distribution which produces a higher and more uniform draw-down rate at high melt extrusion speeds without surging than can be obtained by pyrolysis or mechanical shear degradation.

While not wishing to be bound by any explanation of the theories or mechanisms involved, it is believed that the results obtained can be ascribed to the more thorough and uniform treatment of every portion of the resin mass by the high energy ionizing radiation as compared to mechanical shear degradation or pyrolysis. It is extremely difficult to mechanically shear all portions of a resin mass without producing extensive degradation of some parts of the resin. Also, pyrolysis is subject to heat transfer problems within the mass of molten polymer which results in non-uniform degradation with the molten polymer mass. In the radiation process herein described, each molecule of resin is surrounded by a cloud of high energy particles so that no portion of the polymer is able to escape treatment.

Due to the uniform degradation obtained by the method of the present invention, new and improved α-olefin polymers are obtained. These polymers are unusual in that they are largely comprised of small sized crystallites due to the predominance of chain scission and of small amount of cross-linking insufficient to cause gelation. Moreover, it has been found that the rate of crystallization of the irradiated α-olefin polymers is significantly increased. For example, the rate of crystallization of an irradiated polypropylene of the present invention is about twice that of a conventionally degraded polypropylene.

Typical freezing rate characteristics of the irradiated polypropylene of the present invention obtained with the aid of an extremely sensitive volume dilatometer are compared with a polypropylene degraded to the same melt index by conventional pyrolysis in Table I presented below:

TABLE I

|  | Pyrolysis degraded polypropylene (MI 24) | Irradiated polypropylene (MI 24) |
|---|---|---|
| Initiation Range, °C | 8 | 6 |
| Freezing temperature, °C | 138 | 140 |
| Major Freezing Rate, percent crystallinity/°C | 12.5 | 25 |
| Major Freezing Range, °C | 8 | 4 |
| Overall Freezing Range, °C | 138–90 | 140–60 |

In general, the irradiated material has a broader overall freezing range but the major portion of the material freezes more rapidly, has a higher freezing point and a smaller initiation temperature differential than the untreated material or that which has been degraded by pyrolysis or mechanical shear. Further analysis of the dilatometric data has shown that the irradiated polymers of the present invention have a substantially higher concentration of small crystallites and a lower concentration of large crystallites than the conventionally degraded polypropylene which further indicates the greater uniformity of treatment obtained by the method of the present invention.

Moreover, it has been found quite unexpectedly that the percent crystallinity of the irradiated polymers of the present invention increases at a constant rate at temperatures between 0° C. and 100° C. whereas the same polymers prior to irradiation and those degraded by pyrolysis and/or mechanical shear have been found to exhibit accelerating percent crystallinity within this range. The irradiated polymers of this invention are also unusual in that the percent crystallite distribution of said polymers is constant at temperatures between about 0° C. and 100° C. while the same polymers prior to irradiation or those degraded by other means have increasing percent crystallite distribution within this range.

After irradiation, it is considered preferably to immediately blend the irradiated polymer with antioxidant and flux the mixture by compounding, extrusion or other thermal processing means at a temperature above the melting point of the resin but below that temperature at which additional degradation, as for example, through pyrolysis, would occur. After fluxing with antioxidant and other additives, if desired, the material can be pelletized or otherwise prepared for subsequent usage.

The following examples are merely illustrative of the present invention and are not to be construed in any limitative manner. Unless otherwise specified all percentages and parts are by weight.

Although the effects of irradiation on α-olefin polymer can be observed in any thermoforming operation such as slot extrusion of sheeting or film, tubular extrusion of film, in pipe extrusion, monofilament and contour extrusion of shaped moldings, rotational casting and the like, the examples presented hereinbelow are directed primarily to the extrusion coating of radiation degraded propylene polymers upon paper. It is clear, however, that the present invention is not to be considered limited either in scope or spirit to this embodiment.

Example I illustrates the unique tendency of propylene polymers to markedly degrade in molecular weight when exposed to very low doses of ionizing radiation whereas the other olefin polymers were not appreciably affected. As can be seen in Table II, it is considered important that the propylene polymers, in particular, have in initial tensile modulus as measured by ASTM D638–60T of at least 20,000 p.s.i. and preferably above about 50,000 p.s.i. Below 20,000 p.s.i., the propylene polymers are generally amorphous and rubbery and show essentially no response to the radiation dosages encompassed by the present invention. At higher radiation dosages, these amorphous species tend to cross-link rather than degrade. The upper limit of tensile modulus is limited solely by the contemplated end use requirements.

*Example I*

Samples of amorphous ethylene-propylene copolymer, i.e., having a tensile modulus below about 20,000 p.s.i., liner polyethylene, and virgin crystalline polypropylene produced by reaction of propylene in the presence of a diethyl aluminum chloride and purple TiCl₃ catalyst system, said polypropylene being what is commonly referred to as "living" polymer, were subjected to radiation doses of 0.1 and 1.0 megarep by passing samples of the polymer through the electron beams of a 2-million-volt, 500-watt Van de Graaff electron accelerator. The resulting polymers were found to have undergone changes in molecular weight as measured by melt flow (ASTM D–1238–57T) as follows:

TABLE II.—EFFECT OF LOW DOSES OF IONIZING RADIATION ON VARIOUS OLEFINIC POLYMERS

| Sample Description | Tensile Modulus (p.s.i.) | Melt Flow After Various Doses of Radiation | | | | | |
|---|---|---|---|---|---|---|---|
| | | No Radiation Exposure | | 0.1 Megarep Exposure | | 1.0 Megarep Exposure | |
| | | 44 p.s.i. 190° C. | 440 p.s.i. 190° C. | 44 p.s.i. 190° C. | 440 p.s.i. 190° C. | 44 p.s.i. 190° C. | 440 p.s.i. 190° C. |
| Ethylene/propylene copolymer (63% propylene) | 50 | 0.48 / 0.57 | 50.5 / 66.6 | 0.46 / 0.47 | 40.6 / 49.6 | .566 / .455 | 57.8 / 46.6 |
| Ethylene/butadiene copolymer (5% butadiene) | 40,000 | 3.3 / 2.75 | 212 | 1.96 / 2.05 | 506 | 1.88 / 1.92 | 325 |
| | | 220° C. | 220° C. | 220° C. | 220° C. | 220° C. | 220° C. |
| Polyethylene (0.954 density) | 80,000 | 0.00 | 0.814 | 0.00 | 0.998 | 0.007 | 1.55 |
| *Isotactic "Living" Polypropylene (intrinsic viscosity=10.3) | 200,000 | 0.113 | 25.2 | 1.63 | 251 | 131 | Liquid. |

*No antioxidant present in the samples prior to irradiation.

Example II

Example II illustrates the range of melt flow obtainable with various grades of polypropylene in pellet and powder forms as a result of irradiation to varying doses with 2 million electron volts from a Van de Graaff accelerator. It can be clearly seen that the response, as measured by melt flow of the polymer, to irradiation is slower and thus more controllable as the resin blend is increasingly ladened with antioxidant and other additives. Thus the melt flow or amount of degradation can be increased as the amount of radiation dosage is increased without fear of excessive or uncontrollable degradation occurring as in Table II. The same effect, i.e., controllable degradation is noted when the polymer is subjected to radiation in pellet form as opposed to particulate form, i.e., as a powder or flake. It is believed that the effect of pelletizing and/or the presence of antioxidant or other foreign molecules interfere in some manner with irradiation thereby necessitating larger doses to obtain the same melt flow in a controllable manner as when the virgin polymer is employed.

In a preferred embodiment of the present invention, α-olefin polymers and more preferably propylene polymers, in powder form, containing a stabilizing amount of antioxidant are subjected to irradiation as described above and thereafter blended and fluxed with an additional stabilizing amount of antioxidant and other additives such as dyes, fillers, and the like and formed into pellets.

The results summarized in Table III were obtained in a manner similar to that described in Example I.

TABLE III.—EFFECT OF VARYING DOSE ON MOLECULAR WEIGHT OF VARIOUS TYPES OF POLYPROPYLENE AS MEASURED BY MELT FLOW

| Sample Description | Radiation Dose, megareps | Melt Flow, decigrams/min., 230° C, 44 p.s.i. |
| --- | --- | --- |
| Isotactic polypropylene (powder form), intrinsic viscosity=3, density=0.905, 0.07% dibutyl para cresol. | 0<br>0.1<br>0.5<br>1.0<br>2.0 | 1.88<br>2.07<br>11.51<br>18.52<br>36.8 |
| Polypropylene (pellet form) containing dibutyl para cresol and dilauryl thiodipropionate melt flow at 230° C.=4, density=0.905. | 0<br>0.1<br>0.5<br>1.0<br>1.5<br>2.0<br>2.5<br>3.0 | 4.09<br>4.52<br>5.53<br>7.76<br>9.16<br>12.41<br>14.81<br>17.24 |
| 99% crystallinity polypropylene (powder form) 0.1% dibutyl para cresol and 0.15% 1,3,5-tris(3,5-dialkyl-4-hydroxy benzyl)-2,4,6-trialkyl benzene. | 0<br>0.1<br>1.0 | 0.004<br>0.187<br>10.18 |
| Polypropylene (pellet form) containing about 0.1% 1,3,5-tris(3,5-dialkyl-4-hydroxy benzyl)-2,4,6-trialkyl benzene and trace amounts of dilaurylthiodipropionate, density=0.905, melt flow @ 230° C.=2.5. | 0<br>0.1<br>0.5<br>1.0 | 2.55<br>2.94<br>4.05<br>6.13 |
| Polypropylene (pellet form) containing about 0.1% 1,3,5-tris(3,5-dialkyl-4-hydroxy benzyl)-2,4,6-trialkyl benzene and dilaurylthiodipropionate, density=0.905, melt flow @ 230° C.=3.0. | 0<br>0.1<br>0.5 | 3.0<br>3.39<br>4.46 |

The propylene polymers resulting from radiation degradation are fully equivalent in physical properties to propylene polymers of the same melt flow obtained by other means. This is shown in Example III.

Example III

A quantity of isotactic polypropylene having a reduced viscosity of 6 was given radiation doses of 0.36 and 0.75 megarep by passing the resin, in powder form, under the beam of a 2 million electron volt Van de Graaff accelerator while resting on a stainless steel conveyor belt. The melt flow of the resulting material after irradiation and stabilization with antioxidants were 6 and 12 decigrams per minute respectively. The samples were extruded through a slot die onto a chill-roll and wound up as flat film. The physical properties evaluation of the resulting films is shown in Table IV, in comparison with a control sample of polypropylene degraded by mechanical shear degradation.

TABLE IV.—PHYSICAL PROPERTIES OF SLOT CAST POLYPROPYLENE FILM

| Sample No. | 1 | 2 | 3 |
| --- | --- | --- | --- |
| Radiation Dose, megareps | 0.36 | 0.75 | 0 |
| Melt Flow at 230° C., decigrams/min. | 6 | 12.3 | 5.3 |
| Gloss, 45 Dull | 88 | 87 | 88 |
| Specular Transmission, percent | 86 | 89 | 90 |
| Tensile Strength, p.s.i.: | | | |
| Machine Direction | 6,080 | 6,230 | 5,550 |
| Transverse Direction | 3,750 | 5,014 | 5,110 |
| Percent Elongation: | | | |
| M.D | 554 | 596 | 558 |
| T.D | 404 | 556 | 560 |
| Tensile Impact Strength, ft.-lbs./in.$^3$: | | | |
| 23° C. M.D | 31 | 20 | 26 |
| T.D | 23 | 24 | 27 |
| 0° C. M.D | 20 | 16 | 16 |
| T.D | 18 | 16 | 19 |
| −18° C. M.D | 15 | 14 | 14 |
| T.D | 16 | 14 | 13 |

Example IV 100 pounds of isotactic polypropylene having a melt flow at 230° C. and 44 p.s.i. of 0.16 and containing 0.08% dibutyl para cresol was subjected to a radiation dose of 0.2 megarep in the manner described above. The resulting product was compounded with antioxidants and a suitable buffer in an extruder having a die maintained at 215° C. and a band heater at 210° C. The extruder drive was run at 1800 r.p.m. The resin formulation was 0.015% calcium stearate, 0.15% dibutyl para cresol, and 0.15% dilaurylthiodipropionate, the remainder being irradiated propylene resin.

Biaxially oriented film was prepared using the process described in French Patent 1,274,521. Unoriented tubing was made by extruding the above described polymer through an annular die equipped with an annular orifice. The extruder was operated at 380–400° F. with the die maintained at 420° F. The tubing was drawn away from the die at four feet per minute by means of driven squeeze rolls, sufficient internal air pressure being applied to obtain tubing of 2¼ inches in flat width and 18 mils in thickness.

The flattened tubing was biaxially oriented by being inflated and fed through a radiant heater at a feed rate of 2.7 feet per minute and withdrawn therefrom at a rate of 16 feet per minute. The oriented tubing produced was 12 inches in flat width.

The film produced from this irradiated resin was fully equivalent to that blown from polypropylene degraded by thermal means. The properties listed below are similar to those which one would obtain from propylene containing non-nucleating agents.

| | | |
| --- | --- | --- |
| Haze | Percent | 6.7 |
| Secant modulus | p.s.i. (MD) | 278,000 |
| | p.s.i. (TD) | 273,000 |
| Tensile strength | p.s.i. (MD) | 23,500 |
| | p.s.i. (TD) | 22,100 |
| Elongation | Percent (MD) | 70 |
| | Percent (TD) | 61 |

Example V, below, illustrates an experiment in which a radiation degraded polypropylene of a melt flow of 11 decigrams per minute at 230° C. was compared in extrusion coating characteristics with a commercial polypropylene having a melt flow of 14 decigrams per minute under comparable extrusion conditions. Despite the lower melt flow the radiation degraded sample had essentially the same no-surge speed as the commercial sample.

Example V 100 pounds of isotactic polypropylene having a reduced viscosity of six were irradiated in powder form to a dose of 0.75 megarep. This treated polymer was blended with anti-oxidants and stabilizers by continuous tumbling and was pellitized after passing through the extruder. The treated resin was found to have a melt flow at 230° C. of 11 decigrams per minute. This resin was used to coat 30# kraft paper at 588° F. using an extruder with a 12-inch coat hanger type slot die. Extrusion was at a nominal rate of 36 pounds per hour. For comparison the commercial sample of polypropylene having a melt flow of 14 was also extruded under comparable conditions. The radiation degraded sample produced 0.9-mil coating thickness at essentially the same no surge speed and the melt flow 14 produced 0.7-mil coating thickness.

Example VI describes an experiment wherein isotactic polypropylene was degraded in molecular weight by radiation to a melt flow of 24 decigrams at 230° C. and extruded onto kraft paper at high speed. No surge speeds of 350 feet per minute with coating thickness of 0.3 mil were realized. A commercial sample of polypropylene having a melt flow of 23 decigrams per minute could not be extruded above 200 feet per minute without surging the thinnest coating obtained was 0.6 mil. Another commercial sample of polypropylene having a melt flow of 31 decigrams per minute could not be extruded above 250 feet per minute without surging. This latter sample which was produced by thermal degradation exhibited poor draw-down due to its low molecular weight.

Example VI

A 100-pound sample of polypropylene having a nominal reduced viscosity of 3 was irradiated to a dose of 0.5 megarep with 2 million electron volts from a 500-watt Van de Graaff accelerator equipped with a 16-inch scanning width. The resin had a melt flow of 24 decigrams per minute. The resin was subsequently compounded with anti-oxidants and pelletized. This resin was used to coat 30# kraft paper using an extruder with a 12-inch coat hanger type slot die. Extrusion was at a nominal rate of 36 pounds per hour. Comparison of extrusion coating characteristics between commercial polypropylenes degraded by thermal and mechanical means and polypropylenes degraded by irradiation in accordance with the present invention is shown in Table V.

TABLE V.—EXTRUSION COATING DATA

| Sample | 1 | 2 | 3 | 4 | 5 |
|---|---|---|---|---|---|
| Radiation Dosage, megarep | 0 | 0.75 | 0 | 0.5 | 0 |
| Melt Flow at 230° C., 44 p.s.i. | 14.0 | 10.9 | 22.8 | 24 | 31.2 |
| Compound Temperature, ° F. | 594 | 599 | 558 | 580 | 554 |
| No Surge Speed, f.p.m. | 180 | 170 | 200 | 350 | 250 |
| Neck-in, No Surge Speed, in. | 2½ | 3½ | 2⅞ | 3¼ | 3¼ |
| Neck-in, 1.5 mil, in. | 2½ | 3 | 2¼ | 2½ | 2⅛ |
| Basis Weight, 1.5 mil, lbs./rm | 22 | 24 | | 18.8 | |
| Basis Weight, No Surge Speed | 10 | 13 | 8.4 | 4.0 | 6.4 |
| Coating Thickness, 1.5 mil, mils | 1.6 | 1.7 | | 1.4 | |
| Coating Thickness, No Surge Speed | 0.7 | 0.9 | 0.6 | 0.3 | 0.5 |

Example VII 110 grams of 0.905 density isotactic polypropylene (70% crystalline) having an intrinsic viscosity of 3 and having 0.08% dibutyl para cresol incorporated therein was irradiated to a dose of 1 megarep delivered from a 2 million electron volt Van de Graaff accelerator. The resin, in powder form, was passed under the beam of the accelerator while resting on a stainless steel conveyer belt travelling at a rate of 40 feet per minute using a 12-inch beam scanning width.

The powdered resin was thereafter compounded with 0.2% calcium stearate, 0.08% dibutyl para cresol and 0.15% dilaurylthiodipropionate and pelletized. The pellets were extrusion coated onto 30# kraft paper using a compounding temperature of 305° C. The resin feed rate was 36 pounds per hour. The draw-down rate was 350 feet per minute without surging. A control sample of polypropylene having a melt flow of 24 gave a draw-down of 160 feet per minute without surging at the same feed rate and compounding temperature.

Example VIII

An interpolymer of propylene and ethylene containing from 1 to 2% ethylene combined was made using diethylene aluminum chloride and purple TiCl$_3$ catalyst. The birefrigent melting point of the sample was 154° C. and the melt flow at 230° C. was zero. This polymer was irradiated to a dose of 1.5 megareps. The resulting polymer had a melt flow at 230° C. of 0.14.

Example IX

A block copolymer of propylene and about 1 to 3 percent by weight ethylene was prepared using a diethyl aluminum chloride and purple titanium trichloride catalyst system. Propylene was added to the reaction system at atmospheric pressure and ambient temperature for one hour followed by a nitrogen purge for about 30 minutes. Thereafter, ethylene was added for two minutes followed by a nitrogen purge for 15 minutes. Finally, propylene was again added for one hour. The complete cycle was again repeated and the resulting polymer was thereafter recovered. With this catalyst system, the polymer chains are susceptible to continuous growth throughout the reaction, hence, they are commonly referred to as "living" polymers, and their structure is substantially dependent upon the duration of the particular monomer addition period. The resulting polymer contained infrared bands at 13.7 and 13.9 microns indicating the presence of ethylene blocks. In addition, the spectrum showed that about 97% of the polymer was highly crystalline polypropylene in structure. The birefrigent melting point was 173.5° C. The melt flow of this polymer was 0 at 230° C. This sample was irradiated with 2 megareps dose of 2 million volt electrons. The resulting product had a melt flow of 0.39.

Example X

An ethylene-propylene block copolymer was prepared having two propylene blocks on either side of an ethylene-propylene copolymer block. The catalyst was the same as used in the Examples VIII and IX. The following sequence of polymerization was used. First propylene was passed into a heptane-catalyst solution alone for 2 hours. Then ethylene and propylene in a 1:1 volume ratio were added for 5 minutes. Then the ethylene flow was discontinued and propylene flow continued for 2 hours. This polymer contained infrared bands characteristic of polypropylene as well as bands at 13.7 and 13.9 characteristic of ethylene polymer. The polymer contained about 95% polypropylene and had a melt flow at 230° C. of zero. After a 1.5 megarep dose of 2 mev., the polymer had a melt flow of 0.2 at 230° C.

Example XI

An ethylene-propylene block copolymer consisting of one short block of ethylene and one long block of propylene segments was prepared using the catalyst system employed in Example X by passing ethylene into the catalyst system under atmospheric pressure and ambient temperature for 15 minutes followed by a nitrogen purge for 25 minutes. Thereafter, propylene was passed into said system for 5 hours at 20 p.s.i. The resulting polymer was recovered and found to contain about 5% by weight polyethylene and had a melt flow at 230° C. of 0.07. This polymer was stabilized with dibutyl para cresol and 1,3,5-tris - (3,5 - dialkyl - 4 - hydroxybenzyl) - 2,4,6 - trialkyl benzene and irradiated with 2 mev. to a dose of 2 megareps. The final melt flow was 4.5 decigrams/min. The properties of the final product were found to be:

| | |
|---|---:|
| 1% tensile modulus _____ p.s.i. | 150,000 |
| Tensile strength _____ p.s.i. | 5,000 |
| Elongation _____ percent | 1,000 |
| Impact strength _____ ft. lb./in.³ | 40–60 |

This product was too stiff to fabricate prior to irradiation.

*Example XII*

A "living" polymer of polypropylene was made employing the catalyst system described above so as to be highly isotactic. Its melt flow at 230° C. was 0.05 dgm./min. After stabilization with dibutyl para cresol and 1,3,5-tris(3,5-dialkyl-4-hydroxybenzyl)-2,4,6 - trialkyl benzene, the sample was irradiated to a total dose of 2.5 megareps. The final melt flow was 6.3 dgm./min.

Properties:

| | |
|---|---:|
| 1% tensile modulus _____ p.s.i. | 130,000 |
| Tensile strength _____ p.s.i. | 4,800 |
| Elongation _____ percent | 1,000 |
| Impact strength _____ ft. lb./in.³ | 30–50 |

A high level of antioxidant concentration caused the radiation dose to be unnecessarily high compared to earlier examples. The block copolymers can be similarly affected.

This product was too stiff to fabricate prior to irradiation.

*Example XIII*

A block copolymer consisting of two long sequences of propylene chain segments on either side of a short random ethylene-propylene block was prepared employing the catalyst system described in the preceding examples by passing propylene at 20 p.s.i. into said catalyst systems for 2 hours and 35 minutes. Thereafter, the pressure was reduced to atmospheric and both propylene and ethylene in a 1:1 volume ratio were passed into the system for 15 minutes. The ethylene flow was then discontinued however, the propylene flow was maintained for an additional 15 minutes followed by a final charge of propylene into the system at 20 p.s.i. over a period of 2 hours and 15 minutes. The resulting polymer was recovered and stabilized as in Example XII and was found to have a melt flow at 230° C. of 0.03 dgm./min. A 2 megarep dose raised the melt flow to 3.8 dgm./min.

Properties:

| | |
|---|---:|
| 1% tensile modulus _____ p.s.i. | 100,000 |
| Tensile strength _____ p.s.i. | 6,000 |
| Percent elongation _____ | 1,100 |
| Pendulum impact _____ ft. lb./in.³ | 40–110 |

This product was too stiff to fabricate by compression molding prior to irradiation.

*Example XIV*

A block copolymer of ethylene and propylene consisting of a long propylene block and a random ethylene/propylene copolymer block was prepared employing the catalyst system described hereinabove by passing propylene and ethylene in a 1:1 volume ratio into the catalyst system under atmospheric pressure for 15 minutes. Thereafter, the ethylene flow was terminated and the propylene flow continued for an additional 18 minutes. Finally, the propylene was charged to the system at 20 p.s.i. for 4 hours and 50 minutes. The resulting polymer was recovered and stabilized in the same manner as described in Example XII and was found to have a melt flow at 230° C. of 0.06 dgm./min. After 2.25 megareps dose the melt flow was 8.5 dgm./min.

| | |
|---|---:|
| 1% tensile modulus _____ p.s.i. | 120,000 |
| Tensile strength _____ p.s.i. | 6,000 |
| Percent elongation _____ | 1,200 |
| Pendulum impact _____ ft. lb./in.³ | 30–50 |

This polymer was too stiff to fabricate into film by compression molding prior to irradiation.

*Example XV*

Table VI presented below illustrates the applicability of the present invention to the controllable degradation of the higher alpha olefin polymers. The flow properties, shown as either melt flow or reduced viscosity, are a measure of the net changes in molecular weight which result from chain scission and crosslinkage; an increase in melt flow is indicative of a decrease in molecular weight whereas an increase in reduced viscosity is indicative of an increase in molecular weight. Unless otherwise specified, the melt flow data was obtained at 190° C. and 44 p.s.i. and the reduced viscosity data was obtained with samples of 0.1 gram of the polymer dissolved in 100 ml. of decalin at 135° C. The samples were subjected to irradiation in the manner hereinabove described.

TABLE VI

| α-Olefin polymer | Methylene/methylidyne ratio | Radiation Dose, megareps | Melt Flow, dgms./min. | Reduced viscosity |
|---|---|---|---|---|
| Poly(butene-1) | 2/1 | 0 | 0.76 | |
| | | 0.5 | 4.5 | |
| | | 1.0 | 9.9 | |
| | | 2.0 | 43.3 | |
| | | 3.0 | 65.1 | |
| Poly(4-methyl-pentene-1)* | 1/1 | 0 | 0.19 | |
| | | 2.0 | 55.0 | |
| | | 3.0 | 154.0 | |
| Poly(hexene-1) | 4/1 | 0 | | 3.39 |
| | | 1.0 | | 0.931 |
| | | 2.0 | | 1.892 |
| | | 3.0 | | 2.40 |
| Poly(heptene-1) | 5/1 | 0 | | 1.9 |
| | | 1.0 | | 0.87 |
| | | 2.0 | | 0.494 |
| | | 3.0 | | 0.567 |
| Poly(octene-1) | 6/1 | 0 | | 1.5 |
| | | 1.0 | | 0.22 |
| | | 2.0 | | 1.35 |
| | | 3.0 | | 1.86 |
| Poly(octadecene-1) | 16/1 | 0 | 52.0 | |
| | | 1.0 | 82 | |
| | | 2.0 | 47 | |

*Since poly(4-methyl-pentene-1) melts at 250° C., the melt flow data was obtained at 265° C.

The above data is better understood if compared with the methylene/methylidyne ratio of the polymers. As this ratio increases, the polymers become more like polyethylene in their response to radiation. As can be seen, poly(octadecene-1), (ratio 16/1) is about the highest poly(α-olefin) which can undergo degradation when subjected to low dose radiation. It was found that poly(octadecene-1) degraded after a one megarep dose but began to crosslink upon being subjected to a dosage of two megareps indicating the low dosage crtiicality which exists at the higher limits of the methylene/methylidyne ratio, i.e., 16:1 as discussed hereinabove. It was also noted that poly(4-methyl-pentene-1), although having a repeating unit containing six carbon atoms, behaved like polypropylene rather than poly(hexene-1). This is apparently due to the 1/1 methylene/methylidyne ratio possessed by both poly(4-methyl-pentene-1) and polypropylene as compared to the 4/1 ratio of poly(hexene-1).

The irradiated α-olefin polymers of the present invention, due to their unique rheological properties, have been found extremely useful in extrusion coating, slot and tubular extrusion of film, pipe extrusion, contour extrusion of shaped moldings, rotational casting and other similar thermoforming operations.

What is claimed is:

1. Method for uniformly and controllably degrading α-olefin polymers containing at least about 50 percent by weight α-olefin, the balance being an olefinic hydrocarbon copolymerizable therewith and having the repeating unit

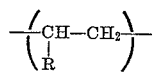

wherein R is an alkyl group containing from about 1 to 16 carbon atoms which comprises subjecting such α-olefin polymer to ionizing radiation having an energy in the range of from about 50 kev. to about 20 mev. to a total dose between about 0.01 to about 3 megareps, whereby the molecular weight of said polymer is decreased.

2. Method described in claim 1 wherein the α-olefin polymers are those which possess a secondary carbon atom to tertiary carbon atom ratio of from about 1:1 to 16:1.

3. Method described in claim 1 wherein the α-olefin polymers are those which possess a secondary carbon atom to tertiary carbon atom ratio of from about 1:1 to 6:1.

4. Method for uniformly and controllably degrading α-olefin polymers containing at least about 50 percent by weight α-olefin, the balance being an olefin hydrocarbon copolymerizable therewith and having the repeating

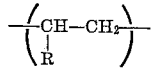

wherein R is an alkyl group containing from about 1 to 16 carbon atoms which comprises subjecting such α-olefin polymers containing a stabilizing amount of antioxidant, in air, to ionizing radiation having an energy level in the range of from about 50 kev. to about 20 mev. to a total dose between about 0.01 to about 3 megareps, blending the irradiated polymer with a stabilizing amount of antioxidant and fluxing the mixture at a temperature above the melting point of the resin but below that temperature at which additional degradation can occur, and thereafter recovering the irradiated, stabilized α-olefin polymer.

5. Method for uniformly and controllably degrading α-olefin polymers containing at least about 50 percent by weight α-olefin, the balance being an olefinic hydrocarbon copolymerizable therewith and having the repeating unit

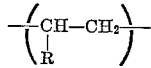

wherein R is an alkyl group containing from 1 to 16 carbon atoms which comprises subjecting such α-olefin polymers containing less than about 0.5 percent antioxidant, in air, to ionizing radiation having an energy level in the range of from about 50 kev. to about 20 mev. to a total dose between about 0.01 to about 3 megareps, blending the irradiated polymer with a stabilizing amount of antioxidant, extruding the resulting mixture, and thereafter recovering the irradiated, stabilized α-olefin polymeric product.

6. Method for uniformly and controllably degrading α-olefin polymers containing at least about 50 percent by weight α-olefin, the balance being an olefinic hydrocarbon copolymerizable therewith and having the repeating unit

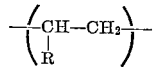

wherein R is an alkyl group containing from 1 to 16 carbon atoms which comprises continuously introducing such α-olefin polymers containing less than about 0.5 percent antioxidant into a zone maintained at atmospheric pressure and ambient temperature wherein said polymer is subjected to uniform exposure of ionizing radiation having an energy level in the range of from about 50 kev. to about 20 mev. to a total dose between about 0.01 to about 3 megareps, and thereafter continuously recovering the irradiated product.

7. Method for uniformly and controllably degrading propylene polymers containing at least about 50 percent by weight propylene, the balance being an olefinic hydrocarbon copolymerizable therewith, said polymers having an initial tensile modulus of at least about 20,000 p.s.i. which comprises continuously introducing such propylene polymers containing less than about 0.5 percent antioxidant into a zone maintained at atmospheric pressure and ambient temperature wherein said propylene polymer is subjected to uniform exposure of ionizing radiation having an energy level in the range of from about 50 kev. to about 20 mev. to a total dose between about 0.01 to about 3 megareps, continuously removing the irradiated propylene polymer and blending a stabilizing amount of antioxidant therewith, fluxing the resulting mixture, and thereafter recovering the irradiated, stabilized propylene polymer.

8. Method as defined in claim 7 wherein the propylene polymer is polypropylene.

9. Method for uniformly and controllably degrading α-olefin polymers as defined in claim 1 wherein the total dose of ionizing radiation is between about 0.01 and about 2 megareps.

10. Method for uniformly and controllably degrading propylene polymers as defined in claim 7 wherein the total dose of ionizing radiation is between about 0.01 and about 2 megareps.

References Cited

Miller et al.: Journal of Poly. Sci., vol. 14, p. 503 (1954).

Black and Lyons: Nature, vol. 180, 1346 (1957).

Charlesby & Pinner: Proc. Roy. Soc. (London), vol. A249, p. 367 (1959).

Waddington et al.: J. of Poly Sci., vol. 31, p. 221 (1958).

Chapiro: Radiation Chemistry of Polymeric Systems, Interscience Pub. 1962, pp. 442–446.

SAMUEL H. BLECH, *Primary Examiner.*

MURRAY TILLMAN, *Examiner.*

N. OBLON, R. B. TURER, *Assistant Examiners.*